US005623097A

United States Patent [19]

Horiguchi et al.

[11] Patent Number: 5,623,097
[45] Date of Patent: Apr. 22, 1997

[54] THERMAL-TYPE FLOW SENSOR

[75] Inventors: Hiroyuki Horiguchi; Norihiko Murata, both of Yokohama; Tatsuo Miyachi, Tokyo, all of Japan

[73] Assignee: Ricoh Company, Ltd., Tokyo, Japan

[21] Appl. No.: 348,083

[22] Filed: Nov. 25, 1994

[30]   Foreign Application Priority Data

Nov. 24, 1994   [JP]   Japan .................................. 5-292294

[51] Int. Cl.$^6$ ...................................................... G01F 1/68
[52] U.S. Cl. ...................................................... 73/204.15
[58] Field of Search ........................... 73/204.27, 204.15, 73/204.26, 204.25, 204.23, 204.11

[56]   References Cited

U.S. PATENT DOCUMENTS

| Re. 33,076 | 10/1989 | Sugiura | 73/204.15 |
|---|---|---|---|
| 5,024,083 | 6/1991 | Inada et al. | 73/204.26 |
| 5,353,638 | 10/1994 | Marek | 73/204.26 |
| 5,392,646 | 2/1995 | Yajami | 73/204.27 |
| 5,423,210 | 6/1995 | Uchiyama | 73/204.15 |
| 5,423,212 | 6/1995 | Manaka | 73/204.26 |

Primary Examiner—Richard Chilcot
Assistant Examiner—Jewel Artis
Attorney, Agent, or Firm—Oblon, Spivak, McClelland, Maier & Neustadt, P.C.

[57]   ABSTRACT

A heater-heat sensor type thermal flow sensor including a substrate installed in a fluid path, a channel formed on a part of the substrate; a bridge suspended over the channel; a heater constructed with an electric resistor formed on the bridge; a temperature sensor for measuring the temperature of the heater which is constructed with another electric resistor situated on the bridge and measuring the temperature of the heater; and a fluid temperature sensor constructed with still another electric resistor formed on a position of the substrate not thermally affected by the heater. There is a bridge circuit including the temperature sensor for measuring the temperature of the heater, the fluid temperature sensor, and first and second resistors both installed outside of the fluid path. A control circuit is provided to control the voltage applied to the heater in accordance with the output of the bridge circuit. The heater and the heat sensor are superposedly formed on the bridge through an interlayer insulating film in order to substantially eliminate the difference between the temperatures of the heater and heat sensor. A temperature compensating circuit is connected to the output stage of the control circuit.

9 Claims, 5 Drawing Sheets

THERMAL-TYPE FLOW SENSOR

BACKGROUND OF THE INVENTION

1. Field of the Invention

The present invention relates to a thermal flow sensor for fluids including gas and liquid (an anemometer, etc.), and in particular relates to a heater and heat sensor thermal flow sensor, hereinafter called "a heater with heat sensor type flow sensor" which is applicable to the control and measurement of gas flow and liquid flow. The invention is more particularly related to medium flow in an air conditioner or cooling apparatus such as a refrigerator or freezer.

2. Description of the Related Art

Conventionally, there exist various sorts of flow sensors. One of them is the thermal-type sensor. As to the thermal-type flow sensor, there exist also various types. The fundamental one among them is the one in which a heat-emitting body such as heater or heat-emitting resistor grid is installed in the fluid, the variation of the energy absorbed by the fluid is detected by measuring the fluid temperature, and thereby the velocity of the fluid can be measured.

As a concrete example, for instance, the published specifications of Japanese Laid-open Patent Publication No. 60-142268/1985 and Japanese Laid-open Patent Publication No. 61-235726/1986 disclose that a channel is formed on a part of the Si substrate by use of anisotropic etching technology, a bridge is suspended over the channel, and a heat-sensitive part is formed on the bridge so that the heat capacitance of the heat-sensitive part can be decreased and further the heat loss on the substrate and the substrate supporter can be reduced. In such construction, the supplied electric power required for heating can be also reduced.

Furthermore, for instance, there exists a method in which the temperature difference between the fluid and the bridge is made constant, both of two sides of the bridge are heated with same electric power. The temperature difference between the upstream side and the downstream side created due to the unbalance of the heat emission into the fluid is detected, and thereby the flowing velocity can be measured.

In such way, since the representative microbridge type flow sensor can measure velocity of the flow with small electric power and high sensitivity, it is a very superior sensor. However, the sensor is easily affected by the ambient temperature and the same has a property of sensitivity greatly depending on the ambient temperature. Such property is not limited to the above microbridge type flowing velocity sensor. It is a large defect of the sensor, commonly, in the overall heat-sensitive flow sensor.

The main reason thereof is that as a resistor element, platinum is employed in the sensor as a material having a small deterioration rate and a high thermal coefficient of resistance.

Figure 9:
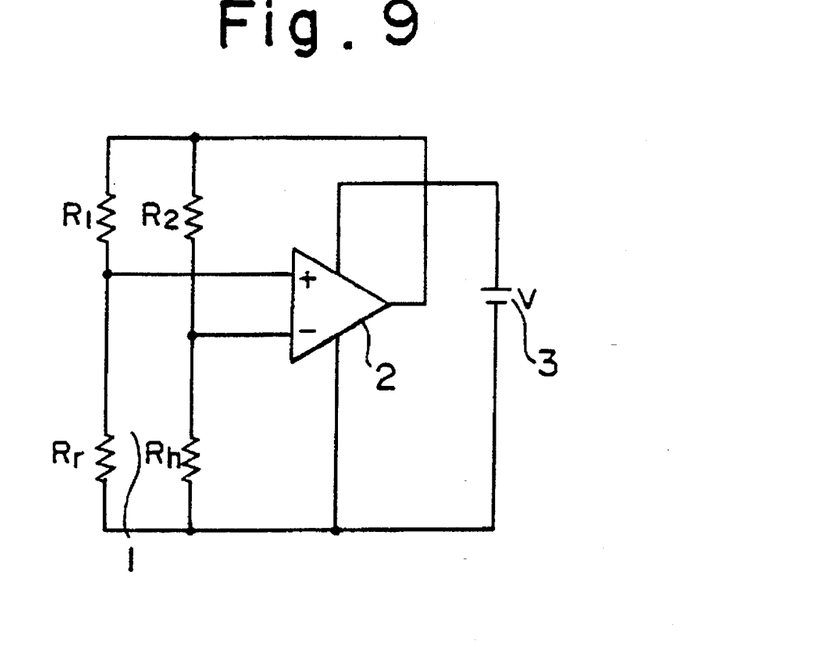
FIG. 9 is a circuit diagram of the conventional directly-heating type sensor.

For this reason, as shown in FIG. 9 as an example, a bridge circuit 1 is constructed with a thin film heater Rh on the bridge together with a temperature sensor using a thin film resistor Rr for measuring the fluid temperature, and first and second standard resistors $R_1$ and $R_2$. Regarding a heater with no heat sensor type flow sensor, the output of the bridge circuit 1 is amplified by an operational amplifier 2 and the voltage applied to the heater Rh is controlled by the above-mentioned amplified output, while there exist various methods of performing temperature compensation of the sensitivity thereof.

However, in order to suppress the temperature increase of the thin film heat sensor Rr due to Joule's heat for measuring the fluid temperature which may become a cause of measurement error, it is necessary to make small the electric current flowing through the heat sensor Rr for measuring the fluid temperature.

For this reason, the resistance value of the first standard resistor $R_1$ of the bridge circuit 1 is required to be a small value. In order to balance the bridge circuit 1, it is necessary to set the ratio of the thin-film resistors respectively forming the other-side which includes the second standard resistor $R_2$ and the heater Rh to a large value and therefore, the design constraints are restricted. Furthermore, since there exists the voltage drop due to the second standard resistor $R_2$, it is necessary for the electric power source 3 to have a high voltage in order to apply a sufficient voltage to the heater Rh. As a result, low-voltage driving turns out to be difficult.

Figure 10:
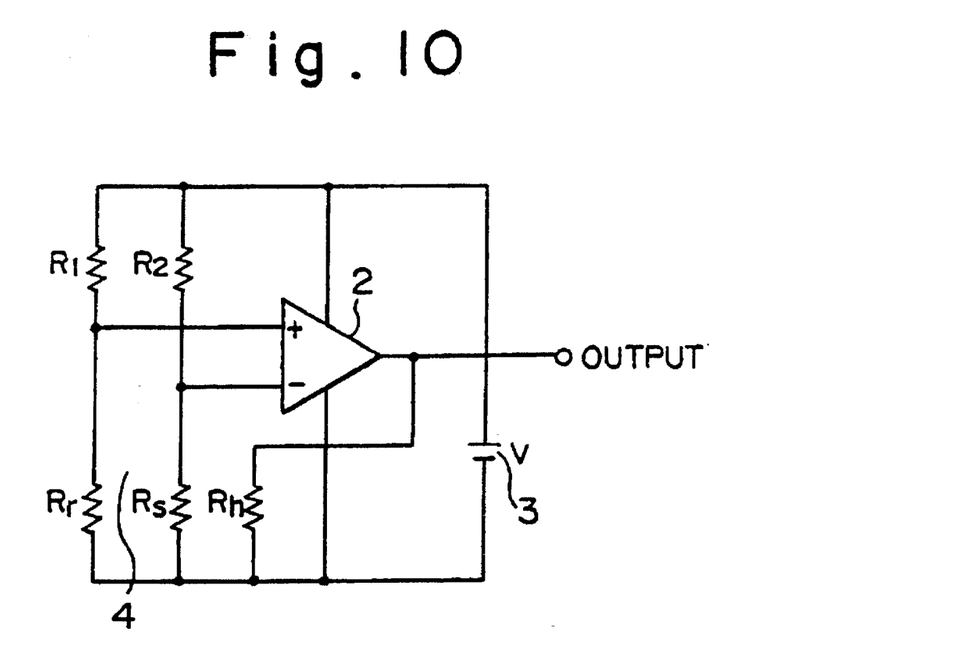
FIG. 10 is a circuit diagram of the conventional heater-heat sensor type flow sensor.

Regarding the above matter, as shown in FIG. 10, according to the heater with heat sensor type thermal flow sensor in which a heat sensor using the thin film resistor Rs for measuring the temperature of the thin film heater Rh is provided, and a bridge circuit 4 including the heat sensor Rs for measuring the temperature of the heater there exists no such problem to be solved. It is a merit of the above-mentioned sensor.

The operation of such heater-heat sensor type flow sensor stands on the large assumption that the temperature of the heater Rh is naturally equal to that of the heat sensor Rs for measuring the heater temperature. However, according to our research or studying in the recent years, it has become apparent that the temperature of the position on the bridge sharply decreases when the measured position goes away from the heater. In other words, the temperature of the heater is not equal to that of the heat sensor which is almost 10 μm apart from the heater. Namely, the above-mentioned large assumption is not applied to the above matter. Furthermore, it has been made apparent also that, when the ambient temperature rises, the temperature difference therebetween tends to become large. Even in the case of the heater-heat sensor type, it is difficult to perform the temperature compensation for the circuit thereof.

For instance, consider the case of the measuring circuit construction as shown in FIG. 10. In the case where the difference between the temperatures of the fluid and the heater Rh is ΔT in a certain fluid temperature, assuming that the resistance values of the respective parts are Rr, Rs, $R_1$ and $R_2$ respectively at the fluid temperature and the thermal coefficient of resistance for Rs is α, it is preferable to set the resistance values of the first and second standard resistors $R_1$ and $R_2$ so as to satisfy the below equation:

$$R_1 \cdot Rs \ (1+\alpha-\Delta T) = R_2 \cdot Rr$$

However, since the temperature of the heater Rh is not equal to that of the heater temperature sensor Rs in practice, the measuring circuit construction as shown in FIG. 10 cannot keep constant the difference ΔT between the temperature of the fluid and that of the heater Rh for the fluid temperature variation.

Namely, even in the case of the heater-heat type sensor, the reasons of the temperature dependence of the sensitivity thereof are shown below.

A. Temperature dependence of the difference between the temperature of the heater Rh and that of the fluid temperature sensor Rs;

B. Temperature dependence of ΔT due to the construction of the measuring circuit as shown in FIG. 10; and C. Temperature dependence of the resistance value.

It is necessary to perform the temperature compensation for compensating the above-listed temperature dependence.

Hereupon, as a trial of compensating the temperature dependence of the sensitivity of such heater-heat sensor type thermal flow velocity sensor with the structure and the material of the sensor chip, for instance, the specification of Japanese Laid-open Patent Publication No. 63-241312/1988 discloses that the heater is made of a material such as nichrome alloy having an abstract value of resistance temperature coefficient not larger than 200 ppm/° C. However, the nichrome is a binary alloy of nickel (Ni) and chrome (Cr), and it is not always easy to form a film of the nichrome alloy as the thin-film resistor in the case of the microbridge type flow sensor. In particular, at the time of mass-production thereof, it is difficult to keep constant the ratio of Ni and Cr in the thin-film resistor. Further, the unevenness between the batches becomes large and the cost for adjustment increases.

SUMMARY OF THE INVENTION

Accordingly it is an object of the present invention to solve the aforementioned problems. It is another object of the present invention to provide a thermal flow sensor capable of easily performing the temperature compensation of the circuit by eliminating the difference between the temperature of the heater and that of the heater temperature sensor which is a defect of the heater-heat sensor type thermal flow velocity sensor.

It is still another object of the present invention to keep constant the difference $\Delta T$ between the temperature of the fluid and that of the heater Rh for the variation of the fluid temperature. It is still another object of the present invention to keep constant the ratio of the materials forming of the thin-film resistor of the heater at the time of mass-production. It is still another object to reduce unevenness between batches.

These and other objects are accomplished by a heater with heat sensor type flow sensor constructed according to the present invention. In the sensor of the present invention, there is a substrate installed in a fluid path, a channel formed on a part of the substrate; a bridge suspended over the channel; a heater constructed with an electric resistor formed on the bridge; a temperature sensor for measuring the temperature of the heater which is constructed with another electric resistor situated on the bridge and measuring the temperature of the heater; and a fluid temperature sensor constructed with still another electric resistor formed on a position of the substrate not thermally affected by the heater. There is a bridge circuit including the temperature sensor for measuring the temperature of the heater, the fluid temperature sensor, and first and second resistors both installed outside of the fluid path. A control circuit is provided to control the voltage applied to the heater in accordance with the output of the bridge circuit. The heater and the heat sensor are superposedly formed on the bridge through an interlayer insulating film in order to substantially eliminate the difference between the temperatures of the heater and heat sensor. A temperature compensating circuit is connected to the output stage of the control circuit. In the present invention, the bonding pad for the heater made of Pt is constructed with a two layer structure of Cr and Pt with the Cr layer utilized as the bonding or adhesive layer. In this manner, the adhesiveness of the Pt can be improved.

DETAILED DESCRIPTION OF THE PREFERRED EMBODIMENTS

Overview of Embodiments

In consideration of the above-mentioned matters, the preferred embodiments of the present invention are described hereinafter with regard to the first through sixth embodiments. It is to be noted that the drawings will be discussed below, after the various embodiments and functions thereof are described.

According to the first embodiment of the present invention, there is a heater-heat sensor type thermal flow sensor which comprises;

a substrate installed in a fluid path;

a channel formed on a part of the substrate;

a bridge suspended over the channel;

a heater constructed with a thin film electric resistor formed on the bridge;

a temperature sensor for measuring the temperature of the heater which is constructed with a thin film electric resistor situated on the bridge; and a fluid temperature sensor constructed with a thin film electric resistor formed at any position on the substrate not thermally affected by the heater. There is also a bridge circuit constructed with the heat sensor for measuring the temperature of the heater, another temperature sensor for measuring the temperature of the fluid, and two resistors, called first and second resistors which are conventional or standard, both installed outside of the flowing path. A control circuit is provided in order to control the voltage applied to the heater in accordance with the output of the bridge circuit. The heater and heat sensor are superposedly formed on the bridge through an insulating film inserted between the layers thereof, and further a temperature compensating circuit is provided in the output stage of the above-mentioned control circuit.

In the second embodiment of the present invention, a temperature compensating resistor is connected, in series, to the heater, in place of the temperature compensating circuit mentioned in the first embodiment.

According to the third embodiment of the present invention, there is a heater-heat sensor type thermal flow sensor which comprises:

a substrate installed in the fluid path;

a channel formed on a part of the substrate;

a bridge suspended over the channel;

a heater constructed with a thin film electric resistor formed on the bridge;

a temperature sensor for measuring the temperature of the heater which is constructed with the thin film electric resistor situated on the bridge; and a fluid temperature sensor constructed with a thin film electric resistor formed on a position of the substrate not thermally affected by the heater. There is also a bridge circuit constructed with the temperature sensor for measuring the temperature of the heater, another temperature sensor for measuring the temperature of the fluid, and first and second resistors which are conventional or standard both installed outside of the flowing path, and a control circuit for controlling the voltage applied to the heater in accordance with the output of the bridge circuit. The heater is formed by platinum chrome alloy and created by annealing a two-layer structure made by forming in order chrome and platinum films on the aforementioned bridge with a temperature of more than 400° C.

In the fourth embodiment of the present invention, as in the case of the first and second embodiments, the heater and the heat sensor are superposedly formed on the bridge through the insulating film between the layers, and further, the resistance of the heat sensor and that of the fluid temperature sensor are set to almost same value.

Furthermore, there is provided a control circuit for controlling the temperature of the heater to a value of temperature a constant-value higher than the temperature of the fluid.

In the fifth embodiment of the present invention, relating to the fourth embodiment, the heater is made of a material having a very small thermal coefficient of resistance compared with that of the heat sensor.

In the sixth embodiment of the present invention, relating to the first, second or fourth embodiment, the bonding pads for the heater are formed with a two layer-structure of chrome and platinum.

FUNCTIONS

In the first embodiment, since the heat sensor is superposedly formed on the heater situated on the bridge through the insulating film to be inserted between the layers, it is possible to make the temperature of the heat sensor almost completely equal to that of the heater. Thereby, the heater-heat sensor type thermal flow sensor can eliminate the temperature characteristic due to the sensor element; that is, the difference between the temperature of the heater and that of the heat sensor.

Furthermore, since the temperature compensating circuit is provided at the output side, the temperature compensation for the circuit can be also secured. Consequently, the temperature characteristic can be improved.

In the second embodiment, as in the case of the first embodiment, since the heat sensor is superposedly formed on the heater situated on the bridge through the insulating film to be inserted between the layers, the heater-heat sensor type thermal flow sensor can eliminate the temperature characteristic due to the sensor element; that is, the difference between the temperature of the heater and that of the heat sensor. In addition, since the temperature compensating resistor is connected in series to the heater in place of the temperature compensating circuit constructed with an operational amplifier, etc., it is possible to perform the temperature compensation by use of the circuit simply and with low cost.

Furthermore, it is possible to perform the temperature compensation without any influence by noise, drift, etc. as in the case of employing the differential amplifier or the like. And further, at the time of designing, it is sufficient to consider only the resistance value of the heater at a certain temperature. Therefore, the unevenness of the sensor elements at the time of manufacturing turns out to be small.

In the third embodiment, relating to the structure of the heater to be formed on the bridge, since the two (double) layer-structure is made by forming, in order, a chrome film and a platinum film on the bridge and the same is annealed with a temperature of more than 400° C. in order to form a platinum-chrome alloy, the value of the thermal coefficient of resistance for the heater is prescribed by the thicknesses of the chrome and platinum films and the annealing temperature. The error in connection with those thicknesses can be suppressed to within almost±5% in the batch and to within almost±10% between the batches. The error of the annealing temperature can be suppressed to within almost±several degrees for the predetermined temperature. Consequently, it is possible to perform mass production of the thin-film heater having a small thermal coefficient of resistance with a good consistency between batches.

In the fourth embodiment, as in the case of the first embodiment, since the heater sensor is superposedly formed on the heater situated on the bridge through the insulating film to be inserted between the layers, the heater-heat sensor type thermal flow sensor can eliminate the temperature characteristic due to the sensor element; that is, the difference between the temperature of the heater and that of the heat sensor. In addition, since the sensor is constructed such that the resistance values of the respective temperature measuring bodies themselves are set to an equal value and the control circuit controls the temperature of the heater so as to make it a constant temperature higher than that of the fluid, it is possible to eliminate even the temperature dependency of the difference between the temperature of the heater and that of the fluid temperature sensor caused by the circuit construction.

In the fifth embodiment, since the heater is made of a substance having a very small thermal coefficient of resistance in addition to the fourth embodiment, it is possible to eliminate the temperature dependency on the resistance value of the heater.

In the sixth embodiment, since the bonding pad portion of the heater is constructed with the two-layer structure of chrome and platinum, the peeling-off of the film can be prevented at the bonding pad portion thereof owing to the superior adhesive characteristic of chrome at the time of manufacturing the sensor chip. Thereby the yield of manufacturing the sensor can be improved.

Embodiments

Figure 1:
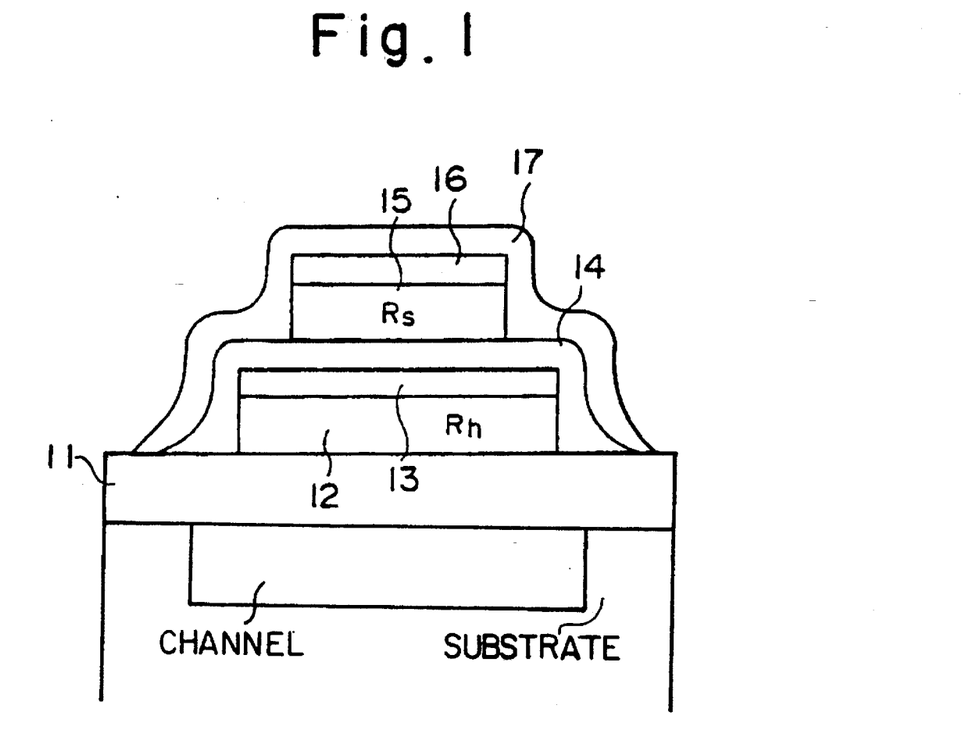
FIG. 1 is an outlined cross-sectional view showing the structure of a portion on the bridge representing the first embodiment of the present invention.
Figure 2:
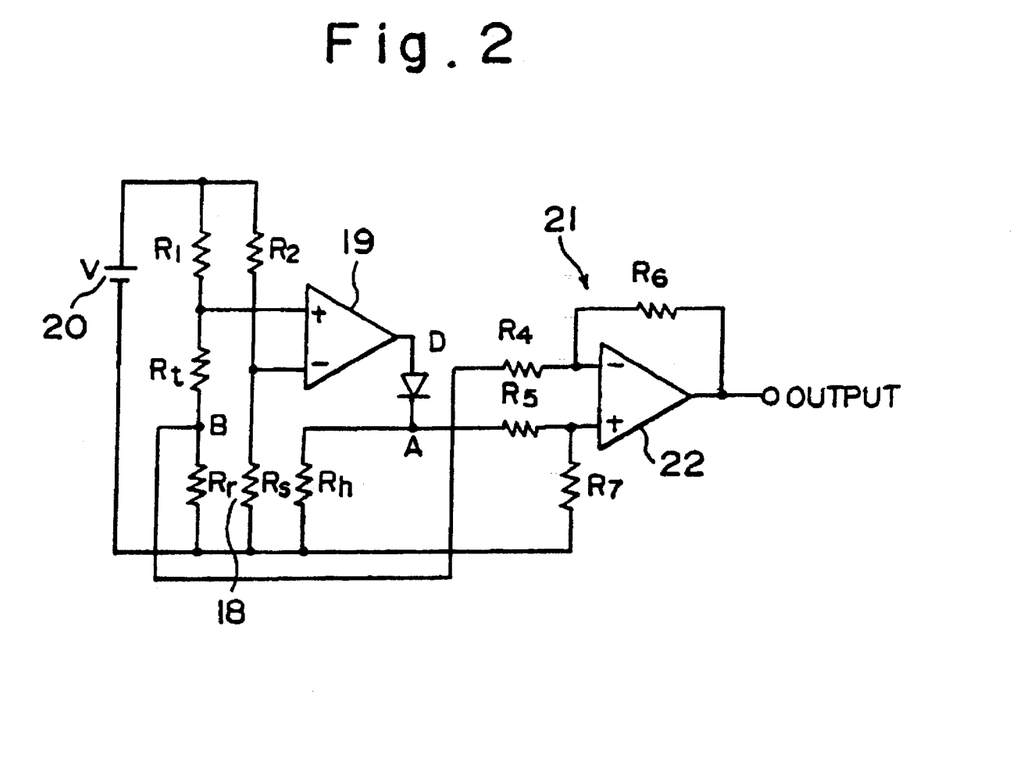
FIG. 2 is a circuit diagram of the first embodiment.

Referring now to the drawings, wherein like reference numerals designate identical or corresponding parts throughout the several views, and more particularly to FIGS. 1 and 2 thereof, the first embodiment of the invention is explained. A heater-heat sensor type thermal flow sensor of the first embodiment includes the elements described above.

The resistance values of the heater, the fluid temperature sensor, the heat sensor, and the first and the second standard resistors are respectively represented by the reference symbols Rh, Rr, Rs, $R_1$, and $R_2$.

In the present embodiment, the sensor structure is firstly featured in that the heat sensor Rs is superposedly formed just above the heater Rh as shown in FIG. 1 in order to precisely measure the temperature of the heater Rh on the bridge so that the temperature thereof is equal to that of the heat sensor Rs. At first, an Si wafer is employed as a substrate (not shown in FIG. 1), and after forming a film of 1 μm thickness by spattering with $Ta_2O_5$ as the material of the insulator and the bridge 11, Pt film 12 of almost 1000 Å thickness and $Ta_2O_5$ film 13 of almost 1000 Å thickness are formed in order on the $Ta_2O_5$ bridge 11. In such manner, the heater Rh and the fluid temperature sensor Rr (not shown in FIG. 1) with the mask of $Ta_2O_5$ film 13 are formed. Next, $Ta_2O_5$ film of almost 2000 Å thickness is formed thereon as an insulating film 14 between the layers. Thereafter, Pt film 15 of almost 1000 Å thickness and $Ta_2O_5$ film 16 of almost 1000 Å thickness are formed in order on the insulating film 14 (on the heater Rh portion).

The film 15 portion is employed as the heat sensor Rs. Finally, $Ta_2O_5$ of almost 500 Å it thickness is formed on the surface thereof as a protection layer 17.

Moreover, not only $Ta_2O_5$ but $SiO_2$, $Si_3N_4$, AlN, etc. can be employed as the insulating film material. In particular, in the case of employing AlN, since the thermal conductivity thereof is high (200 W/m.k), it is superior to employ as the protection layer 17. Further, in the present embodiment, the resistance values of the heater Rh and the heat sensor Rs are determined by the property of Pt. The resistances of Rh and Rs are approximately 1 and 2 kΩ, respectively. Since the line width of the heater Rh can be made wider than that of the heat sensor Rs, it is possible to superpose the heat sensor Rs almost on the center line of the line width of the heater Rh. Hereupon, since the distance between the heater Rh and the heat sensor Rs is almost 3000 Å, it can be presumed that the temperature of the heat sensor Rs may be almost completely equal to that of the heater Rh.

Next, the circuit construction for performing temperature compensation in such heater-heat sensor type flow sensor which comprises the heater Rh and the heat sensor Rs is explained hereinafter referring to FIG. 2.

Even in the present embodiment, as in the case of employing the fundamental circuit construction shown in FIG. 10, a bridge circuit 18 is constructed with the fluid temperature sensor Rr, the heat sensor Rs, and the first and second resistors $R_1$ and $R_2$ which are standard or conventional. Moreover, in the case of the present embodiment, the fixed resistor Rt is interposed between the first standard resistor $R_1$ and the fluid temperature sensor Rr. Further, the sensor circuit is constructed such that the first connecting middle point (junction point) for connecting the first standard resistor $R_1$, the fixed resistor Rt, and the fluid temperature sensor Rr and the second connecting middle point (junction point) are respectively connected to both of the input terminals of the operational amplifier 19 employed as a control circuit. The electric potentials of the first and second connecting middle points are respectively applied to both of the input terminals of an operational amplifier 19 which controls the voltage supplied from an electric power source 20 and applied to the heater Rh through the diode D.

Furthermore, a temperature compensation circuit 21 constructed with the differential amplifier is connected to the output side of the operational amplifier 19. The temperature compensation circuit 21 is constructed with an operational amplifier 22, input resistors $R_4$ and $R_5$ of the amplifier 22, a negative feedback resistor $R_6$, and a grounded resistor $R_7$. Hereupon, the input resistor $R_4$ is connected to the connecting middle point B of the fixed resistor Rt and the fluid temperature sensor Rr, and the other input resistor $R_5$ is connected to the point A which is the output terminal of the operational amplifier 19 and is also, one terminal of the heater Rh.

In such construction, when the difference between the temperature of the heat sensor Rs and the heater Rh is 0 (zero), the above-mentioned circuit controls the voltage applied to the heater Rh in order to keep the difference between the temperature of the fluid temperature sensor Rr and that of the heat sensor Rs (that is, the heater Rh) at a predetermined constant value ΔT.

Hereupon, assuming that the energy required for raising the temperature of the heater Rh up to a predetermined value ΔT higher than the fluid temperature depends only on the flowing quantity (flow rate) to be measured and does not depend on the fluid temperature, the electric power consumed in the heater Rh does not also depend on the fluid temperature and its value becomes constant at a given flow rate.

However, since the heater Rh is made of Pt as mentioned before and its thermal coefficient of resistance α is comparatively large (almost 3000 ppm/° C.), the resistance value of the heater Rh varies due to the temperature variation of the heater Rh accompanying the fluid temperature variation, and thereby the voltage across the both ends of the heater Rh required for obtaining a predetermined electric power consumption varies with the fluid temperature. On this occasion, since Pt has a positive thermal coefficient of resistance, the resistance of Pt rises as the temperature of the fluid increases. As a result of performing the control accompanying the above temperature rise, when the temperature of the heater is raised in order to keep constant the value of ΔT, the resistance value of the heater Rh increases and thereby the voltage across both terminals of the heater Rh increases. Namely, the voltage at the point A also rises up together with (accompanying) the increase of the fluid temperature.

On the other hand, since the fluid temperature sensor Rr is also made of Pt of positive thermal coefficient of resistance α, the voltage at the point B increases when the fluid temperature increases. Consequently, the temperature compensation circuit 21 constructed with the differential amplifier multiplies the voltage at the point B by a predetermined coefficient and subtracts the above multiplied value from the voltage at the point A. The circuit 21 outputs the above subtracted value. In such a manner, the temperature compensation can be done under reduced influence of the fluid temperature variation.

The second embodiment of the invention is explained hereinafter referring to FIG. 3 and FIG. 4. The structure of the sensor in the second embodiment is the same as that in the first embodiment. However, regarding the circuit construction, the temperature compensation circuit 21 is omitted in the second embodiment, and it is possible to avoid the output voltage variation due to the resistance value variation of the heater kh caused by the temperature variation of the heater Rh, only by connecting the heater Rh in series with the temperature compensation resistor Rc.

Figure 3:
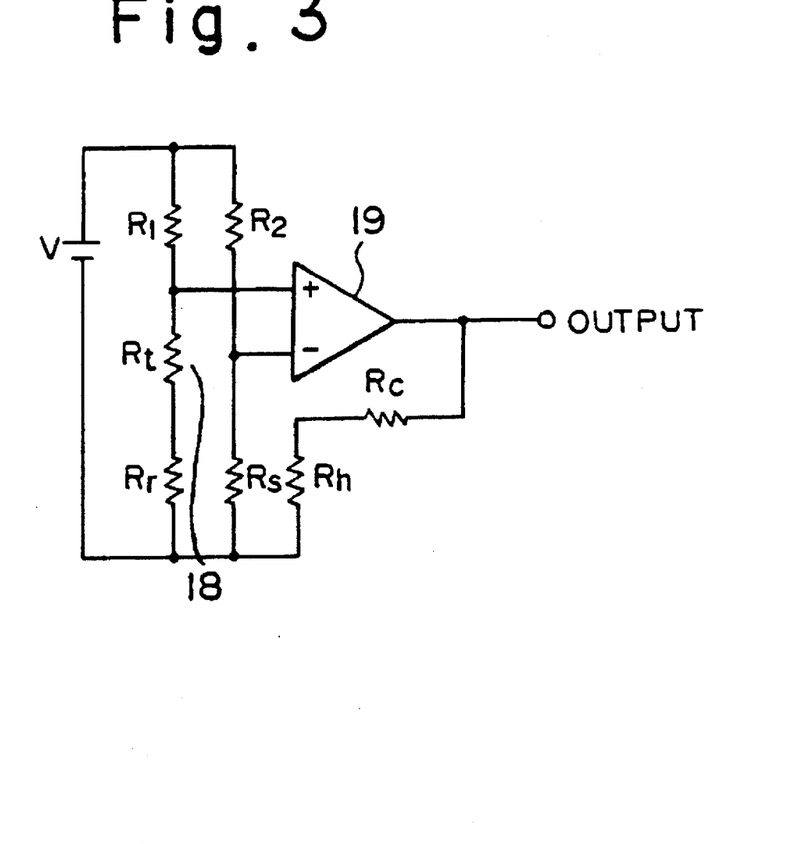
FIG. 3 is a circuit diagram showing the second embodiment of the present invention.
Figure 4:
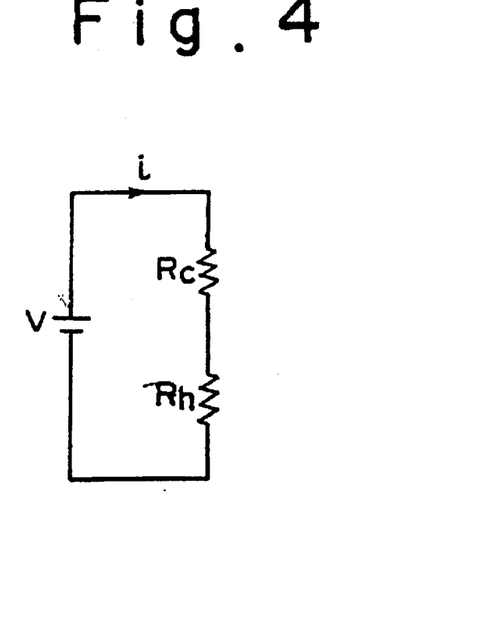
FIG. 4 is an equivalent circuit of the circuit in FIG. 3.

In FIG. 4 showing the equivalent circuit of FIG. 3, the electric power Ph consumed in the heater Rh is analyzed by the following relevant equations:

$$i = V/(Rc+Rh) \quad (1)$$

$$Ph = i^2 Rh \; a\{V/(Rc+Rh)\}^2 Rh \quad (2)$$

$$V = (Rc + Rh)\sqrt{(Ph/Rh)} \quad (3)$$

Hereupon, in order to minimize the variation of the applied voltage V due to the variation of the heater Rh, assuming that the equation (3) is partially differentiated by Rh;

$$\partial v/\partial Rh = \sqrt{(Ph/Rh)} - Ph(Rc+Rh)/2\sqrt{(Ph/Rh)} \; (1/Rh^2) \quad (4)$$

The resistance value of the temperature compensating resistor Rc on the condition of $\delta V/\delta Rh=0$ is as follows:

$$Rc = Rh \quad (5)$$

Namely, at a certain temperature Tx of the heater Rh, it is possible to minimize the variation rate of the output voltage due to the fluid temperature variation by equalizing the resistance value of the heater Rh with that of the temperature compensating resistor Rc.

For instance, on the condition of $\Delta T=40°$ C., it is possible to minimize the variation rate of the output voltage due to the fluid temperature variation at the fluid temperature 20° C. by employing the temperature compensating resistor Rc having same resistance value as that of the heater Rh at the temperature of 40°+20°=60° C.

In the case of the present embodiment, compared with the temperature compensation by the temperature compensation circuit 21 constructed with the differential amplifier as mentioned in the first embodiment, it is sufficient to employ only the temperature compensating resistor Rc, and thereby the sensor system can be constructed simply and at low cost. Furthermore, since the sensor system does not need the operational amplifier 22 for performing temperature compensation, there is no influence by noise, drift, etc. Further, since the resistance value may be established in consideration of only the resistance value of the heater Rh at a certain temperature at the time of design, a consistency of the manufacturing of the sensor element is obtained.

Figure 5A:
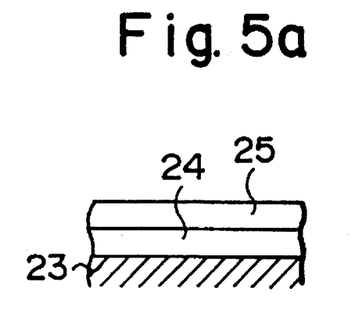
FIGS. 5a through 5d are outlined cross-sectional views showing, in the order of processing, the third embodiment of the present invention.
Figure 5B:
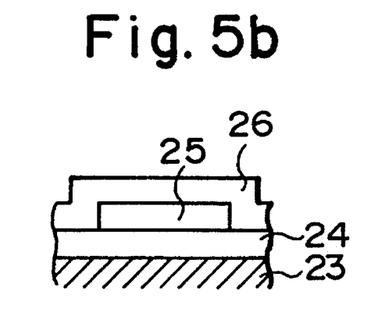

The third embodiment is explained hereinafter referring to FIG. 5a through FIG. 6. The present embodiment avoids the temperature dependence of the sensor sensitivity by forming the heater Rh with material having a very small temperature coefficient and small difference between batches, even when mass produced. FIGS. 5a through 5d show an example of constructing the heater Rh together with the manufacturing process thereof. At first, as shown in FIG. 5a, an insulating film 24 made of a material having a superior electrically insulating property and a superior thermally insulating property such as $SiO_2$, $Si_3N_4$, $Ta_2O_5$, etc. is formed on the Si substrate 23 by means of a vaporizing or spattering method. Next, the Cr film 25 is formed on the insulating film 24 by the same method, and as shown in FIG. 5b and the patterning of the film is performed in the shape of the heater by photolithography. Furthermore, the Pt film 26 is formed on the Cr film 25.

Figure 5C:
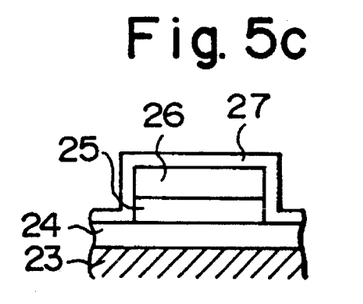
Figure 5D:
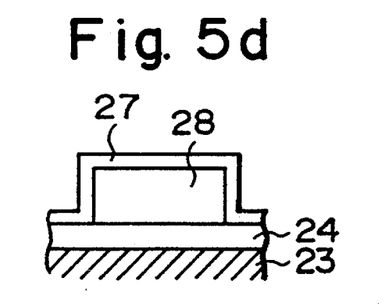

As shown in FIG. 5c, the Pt film is patterned in a form of the heater using photolithography. At this time, the film 26 is also patterned in the form of the fluid temperature sensor. In such a manner, the two-layered structure of Cr and Pt can be obtained. Thereafter, as shown in FIG. 5c, the protection film 27, for instance, made of $Ta_2O_5$ is formed thereon and further processed with annealing at the temperature of almost 500° C. In such a manner, the two-layered structure of Cr and Pt treated with the patterning is made in a state of alloy 28 (Pt-Cr alloy), as shown in FIG. 5d. In such a manner, the heater Rh is completed.

Thereafter, the patterning of the substrate 23 is performed in a shape of the channel using dry etching. The channel is formed by anisotropic etching using KOH.

The measurement circuit construction employed for the sensor structure including the heater Rh having a platinum-chrome alloy is similar to the circuit shown in FIG. 10. On this occasion, it is allowable to set the resistance value of the first and second standard resistors R1 and R2 in the bridge circuit 4 so as to be in a balanced condition when the difference $\Delta T$ between the temperature of the heater Rh and that of the fluid takes an optional value.

As a result, the temperature of the heater Rh on the bridge is $\Delta T$ higher than the fluid temperature. Since the bridge is cooled by the fluid flow, the resistance value of the heat sensor Rs decreases. The electric current flows through the heater Rh in proportion to the output from the operational amplifier 2 in FIG. 10 due to the variation of the resistance value, and thereby the temperature of the heater Rh on the bridge is kept constant. The voltage variation at this time becomes the output of the sensor for the fluid flow.

Figure 6:
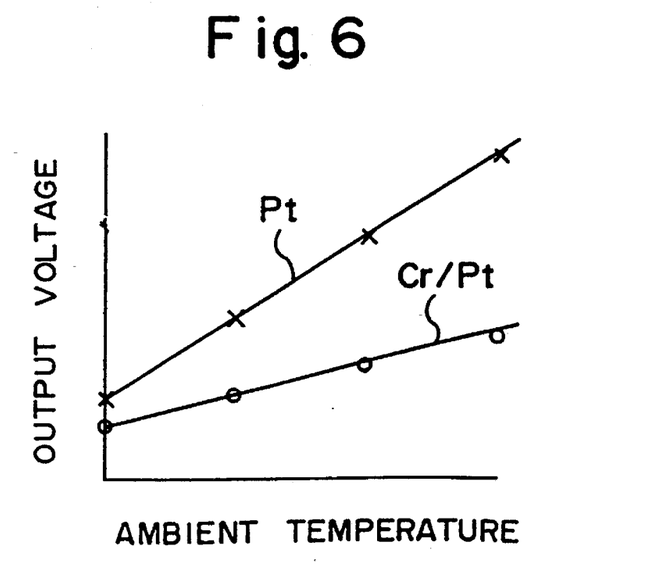
FIG. 6 is a graph showing the property of output voltage—ambient temperature of the third embodiment in comparison with the prior art.

FIG. 6 shows the relationship between the sensor output at a constant flow rate and at the ambient temperature. FIG. 6 shows the sensor output of the present embodiment system (heater Rh made of the platinum-chrome alloy) with that of the prior-art system (heater Rh made of platinum).

According to the present embodiment, the heater Rh of platinum-chrome alloy is made by annealing at approximately 500° C. Since the thermal coefficient of resistance thereof is largely decreased, the heater Rh is scarcely affected by the ambient temperature as shown in FIG. 6. At this time, the temperature coefficient of the heater Rh can be controlled in accordance with the degree of the metal alloy. Such degree can be controlled with the annealing temperature.

In the present embodiment, regarding the structure of the heater Rh formed on the bridge, the value of the thermal coefficient of resistance for the heater Rh is a function of the thicknesses of Cr and Pt and the annealing temperature. Hereupon, it is possible to suppress the distribution of the thermal coefficient of resistance due to the thickness of Cr and Pt in the case of employing the vaporizing method, spattering method, etc. to within almost±5% a batch and to within almost±10% between batches.

Further, regarding the annealing temperature, since it is possible to suppress the difference from the established temperature or the temperature distribution within almost several degrees, the mass production of the heater Rh made of the thin film having a small temperature coefficient results in a good consistency between batches.

Figure 7:
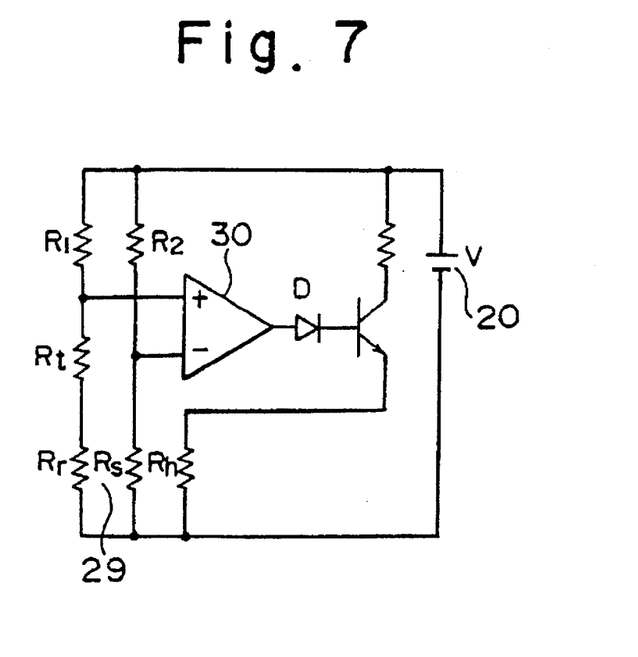
FIG. 7 is a circuit diagram showing the fourth embodiment of the present invention.

The fourth embodiment is explained hereinafter referring to FIG. 7. At first, the sensor structure is the same as that of the first embodiment shown in FIG. 1. In particular, regarding the bridge portion 11, the sensor is constructed such that the heater Rh and the heat sensor Rs are superposed on another through the interlayer insulating film 14, in order to reduce to the utmost the difference between the temperature of the heater Rh and that of the heater Rs.

In relation to such sensor structure, it is possible to adopt, basically for the heater-heat sensor type flow sensor, fundamental circuit construction as shown in FIG. 10 as the measurement circuit construction. However, as mentioned before, since there exists a defect in that the difference between the temperature of the fluid and that of the heater Rh cannot be kept constant for the fluid temperature variation, the present embodiment offers the one devised in the construction of a bridge circuit 29 as shown in FIG. 7. The bridge circuit 29 includes the fixed resistor Rt interposed between the first standard resistor Rl and the fluid temperature sensor Rr. Furthermore, an operational amplifier (control circuit) 30 is connected to the output side of the bridge circuit 29. In such construction, the accuracy of controlling the temperature of the heater Rh can be improved and thereby the influence due to the fluid temperature variation, in other words, the temperature dependence can be reduced, by choosing the respective resistance values of the bridge circuit 29 as described below.

Assuming that the resistance values of the fluid temperature sensor and the heat sensor are respectively Rr and Rs, the difference between the fluid temperature and that of the heater is $\Delta T$, and the thermal coefficient of resistance for both sensors is $\alpha$, the resistance values $R_1$ and $R_2$ of the first and second standard resistors satisfy the following equation:

$$R_1 Rs = R_2 Rr \quad (6)$$

And further, assuming that;

$$Rt = \alpha \cdot \Delta T Rr \quad (7)$$

the resistance value of the fixed resistor Rt satisfying the following equation can be established:

$$Rt = (R_1 Rs(1 + \alpha - \Delta T)/R_2) - Rr \quad (8)$$

In order to prevent the function of keeping the temperature of the heater constant with the bridge circuit 29 from the disturbance due to the heating of the fluid temperature sensor Rr and the heat sensor Rs, it is necessary to set the resistance values of the first and second standard resistors $R_1$ and $R_2$, respectively, to sufficiently large values. Furthermore, in order to make the heating of both sensors Rr and Rs almost the same, the sensor chip is manufactured such that the resistance values of those temperature sensors Rr and Rs have approximately the same values. To state this more concretely, the resistance value of the heat sensor Rs is established to a value within 0.9–1.1 of the resistance value of the fluid temperature sensor Rr. Furthermore, the time-dependent variations of the temperature sensors Rr and Rs show almost the same tendency. Namely, the sensor elements are constructed such that the balance of the bridge circuit 29 at the time of adjusting the circuit may deviate a little.

In the case of keeping the sensor element system on such condition, the circuit shown in FIG. 7 reaches a balanced condition satisfying the below equation under the circumstance of the fluid temperature T° C.:

$$R_2(Rt + Rr) = R_1 RS(_1 + \alpha \cdot \Delta T) \quad (9)$$

Further, in consideration of the case of the fluid temperature T+$\Delta$t, the temperature of the heater Rs is assumed to be T+$\Delta$T+$\Delta$t' on such condition. The circuit shown in FIG. 7 reaches a balanced condition as shown by the following equation on the above-mentioned condition:

$$R_1(Rs(1 + \alpha \cdot \Delta T + \alpha \cdot \Delta t')) = R_2\{Rr(1 + \alpha \cdot \Delta) + Rt\} \quad (10)$$

From those two equations (9) and (10), the following equation (11) can be obtained:

$$Rr(1 + \alpha \cdot \Delta T) = Rr + \alpha \cdot \Delta t' \cdot R_1 Rs/R_2 \quad (11)$$

From those equations (6)–(11), since $\Delta t$ is equal to $\Delta t'$ ($\Delta t = \Delta t'$), the sensor system circuit (measurement circuit) performs the control operation of always keeping the difference between the temperature of the fluid and that of the heat sensor Rs to the value $\Delta T$. In such manner, due to the construction of the measurement circuit the temperature dependence of $\Delta T$ can be improved.

Figure 8:
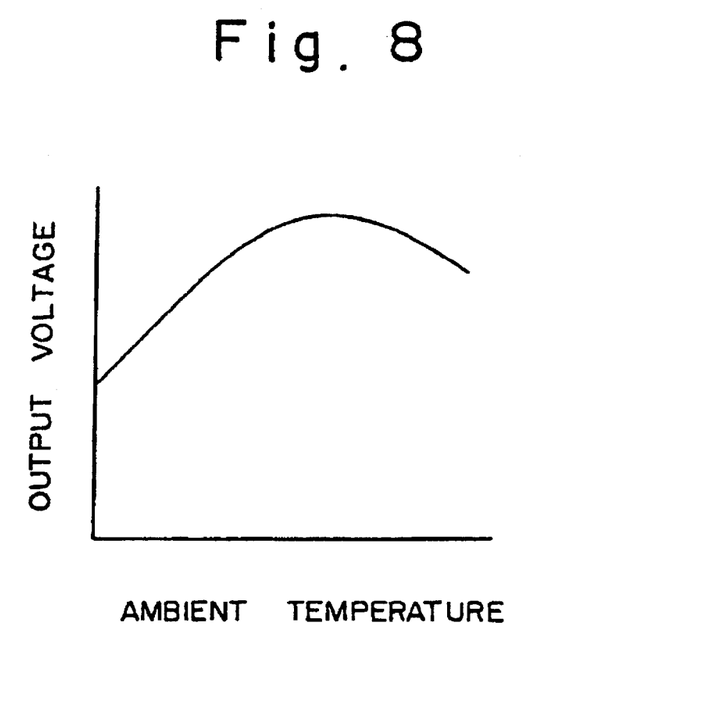
FIG. 8 is a graph showing the property of the temperature dependence of sensitivity for explaining the fifth embodiment of the present invention.

Furthermore, the fifth embodiment is explained hereinafter referring to FIG. 8. In the case of the aforementioned fourth embodiment shown in FIG. 7, the sensor chip and its measurement circuit can be manufactured without any problem and further realize the preferable temperature compensation. However, in wide temperature range such as −30° C. −80° C., the sensor output at a certain flow rate has the property as shown in FIG. 8. Consequently, it is impossible to perform the temperature compensation with high accuracy over the entire area of such wide range, −30° C. −80° C.

In the present embodiment, regarding the temperature dependence of the difference between the temperature of the heater Rh and that of the fluid temperature sensor Rs, the problem of the temperature dependence thereof can be eliminated by employing the structure realized by superposing the heat sensor Rs on the heater Rh through the inter layer insulating film 14 as shown in FIG. 1. On the other hand, regarding the temperature dependence of $\Delta T$ due to the construction of the measurement circuit, the problem to be solved can be eliminated by improving the bridge circuit 29 as illustrated in FIG. 7. (Those countermeasures correspond to the fourth embodiment.) Furthermore, regarding the temperature dependence of the resistance of the heater, the problem to be solved can be eliminated by employing the heater Rh made of a material having a very small thermal coefficient of resistance. To state more concretely, nichrome alloy, platinum-chrome alloy, etc. can be employed as the material for the heater Rh, and it is allowable to employ the material of the heater Rh having the thermal coefficient of its resistance value which is equal to or less than one third (⅓) of the thermal coefficient of resistance of the temperature sensors Rr and Rs.

In the present embodiment, since the influence of the temperature dependence is reduced by practicing the countermeasures for the three items as mentioned above, the temperature dependence of the sensor sensitivity can be reduced to a negligible level.

The sixth embodiment is explained hereinafter. In the case of manufacturing the temperature sensors Rr and Rs and the heater Rh with a Pt thin film, the adhesive property of the material to the substrate layer such as $Ta_2O_5$, $Si_3N_4$ and so on is not always superior. In particular, since the size of the pad is relatively large, the pad tends to be peeled off easily from the substrate, thus reducing the manufacturing yield of the sensor chip. In the present embodiment, in the case of manufacturing the heater Rh with Pt, its bonding pad is constructed with the two-layered structure of Cr and Pt, and the Cr layer is utilized as the bonding (adhesive) layer. In this manner, the adhesiveness of Pt to the substrate can be improved. In such construction, it is possible to prevent the film of the pad from being peeled off during the manufacturing of the sensor chip and the yield thereof can be improved. Moreover, since the wiring path to the temperature sensors Rr and Rs is fine, the adhesiveness thereof is comparatively high and therefore it is not necessary to provide the Cr layer under the Pt layer.

Effects of the Invention

According to the first embodiment of the present invention, it is possible to make the temperature of the heat sensor approximately equal to that of the heater, and thereby it is possible to eliminate the temperature characteristic caused by the sensor element. In other words, the difference between the temperature of the heater and that of the fluid temperature sensor is reduced or almost eliminated and are effectively the same. Furthermore, since the temperature compensating circuit is provided at the output side of the control circuit, the temperature compensation for the circuit can be obtained to improve the temperature characteristic.

According to the second embodiment of the present invention, as in the case of the first embodiment, since the heat sensor is superposedly formed on the heater on the bridge through the inter layer insulating film, the temperature characteristic caused by the sensor element in the heater-heat sensor type thermal flow sensor system. In other words, the difference between the temperature of the heater and that of the heat sensor can be eliminated. In addition, since the temperature compensating resistor is connected in series to the heater in place of the temperature compensating circuit constructed with the differential amplifier, etc., it is possible to perform the temperature compensation for the circuit simply and at low cost. In addition, the circuit is not affected by noise and drift as caused by the differential amplifier, etc. Further, since it is sufficient to calculate only the resistance value of the heater at a certain temperature when designing the flow sensor, the manufacturing consistency of the sensor element can be improved.

According to the third embodiment of the present invention, concerning the structure of the heater formed on the bridge, since the two layer structure of Cr and Pt is formed in order on the bridge, and the two layer structure is annealed at a temperature of more than 400° C. to form the platinum-chrome alloy, the thermal coefficient of resistance of the heater in prescribed by the thicknesses of chrome film and platinum film and the annealing temperature. Further, it is possible to suppress the distribution of the film thicknesses to within almost±5% in a batch and to within almost±10% between batches. Concerning the annealing temperature, it is possible to suppress the error to within almost±several degrees. Consequently, the mass-produced thin film heater having a small thermal coefficient of resistance can be consistently obtained in different batches.

According to the fourth embodiment of the present invention, as in the case of the first or second embodiments, since the heat sensor is superposedly formed on the bridge on the heater through the interlayer insulating film, the temperature characteristic caused by the sensor element in the heater-heat sensor type thermal flow sensor. In other words, the difference between the temperature of the heater and that of the heat sensor can be eliminated. In addition thereto, since the establishments of the resistance values of both sensors (heat sensor and fluid temperature sensor) can be done equally, and the control circuit is constructed such that the temperature of the heater can be controlled so as to be a constant-temperature higher than the fluid temperature. The temperature dependency on the difference between the temperature of the heater and that of the fluid temperature sensor due to the circuit construction can be eliminated.

According to the fifth embodiment of the present invention, in addition to the fourth embodiment, since the heater is made of a substance having a very small thermal coefficient of resistance, the thermal change of the heater's resistance value can be eliminated, and the temperature dependence of the sensor sensitivity can be improved over a wide temperature range.

According to the sixth embodiment of the present invention, in connection with the first, second, or fourth embodiments, since the bonding pads for the heater are formed with the two layer structure of chrome and platinum, the film for the bonding pads can be prevented from being peeled off owing to the excellent adhesiveness given in the manufacturing the sensor chip, and thereby the yield can be improved.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A heater-heat sensor type thermal flow sensor for use in a fluid path, comprising:

a substrate;

a channel formed on a part of said substrate;

a bridge suspended over said channel;

a heater having a first resistance disposed on said bridge;

a heater temperature sensor for measuring a temperature of said heater having a second resistance on said bridge;

an insulating film disposed between said heater and said heater temperature sensor;

a fluid temperature sensor having a third resistance formed on said substrate;

a bridge circuit including said heater temperature sensor, said fluid temperature sensor, a first resistor having a fourth resistance and a second resistor having a fifth resistance disposed outside of the fluid path;

a control circuit for controlling a voltage applied to said heater using an output of said bridge circuit; and a temperature compensating circuit connected to an output stage of said control circuit.

2. A sensor according to claim 1, further comprising:

a bonding pad for said heater including a two layer structure of chrome and platinum.

3. A heater-heat sensor type thermal flow sensor for use in a fluid path, comprising:

a substrate;

a channel formed on a part of said substrate;

a bridge suspended over said channel;

a heater having a first resistance disposed on said bridge;

a heater temperature sensor for measuring a temperature of said heater having a second resistance on said bridge;

an insulating film disposed between said heater and said heater temperature sensor;

a fluid temperature sensor having a third resistance formed on said substrate;

a bridge circuit including said heater temperature sensor, said fluid temperature sensor, a first resistor having a fourth resistance and a second resistor having a fifth resistance disposed outside of the fluid path;

a control circuit for controlling a voltage applied to said heater using an output of said bridge circuit; and a temperature compensating resistor connected in series to said heater.

4. A sensor according to claim 3, further comprising:

a bonding pad for said heater including a two layer structure of chrome and platinum.

5. A heater-heat sensor type thermal flow sensor for use in a fluid path, comprising:

a substrate;

a channel formed on a part of said substrate;

a bridge suspended over said channel;

a heater having a first resistance disposed on said bridge, said heater including a platinum-chrome alloy;

a heater temperature sensor for measuring a temperature of said heater having a second resistance on said bridge;

an insulating film disposed between said heater and said heater temperature sensor;

a fluid temperature sensor having a third resistance formed on said substrate;

a bridge circuit including said heater temperature sensor, said fluid temperature sensor, a first resistor having a fourth resistance and a second resistor having a fifth resistance disposed outside of the fluid path; and a control circuit for controlling a voltage applied to said heater using an output of said bridge circuit.

6. A sensor according to claim 5, wherein:

said heater is formed by annealing two layers of a film structure of platinum and chrome on said bridge at a temperature greater than 400 degrees C.

7. A heater-heat sensor type thermal flow sensor for use in a fluid path, comprising:

a substrate;

a channel formed on a part of said substrate;

a bridge suspended over said channel;

a heater having a first resistance disposed on said bridge;

a heater temperature sensor for measuring a temperature of said heater having a second resistance on said bridge;

an insulating film disposed between said heater and said heater temperature sensor;

a fluid temperature sensor having a third resistance formed on said substrate;

a bridge circuit including said heater temperature sensor, said fluid temperature sensor, a first resistor having a fourth resistance and a second resistor having a fifth resistance disposed outside of the fluid path; and a control circuit for controlling a voltage applied to said heater using an output of said bridge circuit, said control circuit for controlling a temperature of said heater to a temperature which is a constant value higher than a temperature of the fluid;

wherein the second resistance and the third resistance are approximately equal.

8. A sensor according to claim 7, further comprising:

a bonding pad for said heater including a two layer structure of chrome and platinum.

9. A sensor according to claim 7:

wherein said heater comprises a substance having a thermal coefficient of resistance which is smaller than a thermal coefficient of resistance of said heat sensor.

* * * * *

UNITED STATES PATENT AND TRADEMARK OFFICE
CERTIFICATE OF CORRECTION

PATENT NO. : 5,623,097
DATED : April 22, 1997
INVENTOR(S) : Hiroyuki HORIGUCHI, et al.

It is certified that error appears in the above-indentified patent and that said Letters Patent is hereby corrected as shown below:

On the title page, item [30], the Foreign Application Data should read:

--Nov. 24, 1993   [JP]   Japan  ........... 5-292294--

Signed and Sealed this

Twenty-second Day of July, 1997

Attest:

BRUCE LEHMAN

*Attesting Officer*         *Commissioner of Patents and Trademarks*